Sept. 30, 1952  J. D. BRANSON  2,612,207
BUMPER SEAT FOR AUTOMOBILES
Filed Nov. 22, 1949

Inventor

James D. Branson

By *Clarence A. O'Brien
and Harvey B. Jacobson*
Attorneys

Patented Sept. 30, 1952

2,612,207

UNITED STATES PATENT OFFICE 2,612,207

BUMPER SEAT FOR AUTOMOBILES

James D. Branson, Casper, Wyo.

Application November 22, 1949, Serial No. 128,776

4 Claims. (Cl. 155—11)

The present invention relates to new and useful improvements in temporary seats and more particularly to a seat embodying means for attaching the same to a bumper of an automobile.

An important object of the invention is to provide a foldable seat of this character whereby the same may be conveniently carried or stored in a compact form in the vehicle, when not in use.

A further object is to provide novel attaching means for the seat and whereby the attaching means may be adjustable in accordance with various types of automobile bumpers.

A still further object is to provide a device of this character of simple and practical construction, which is strong and durable, neat and attractive in appearance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
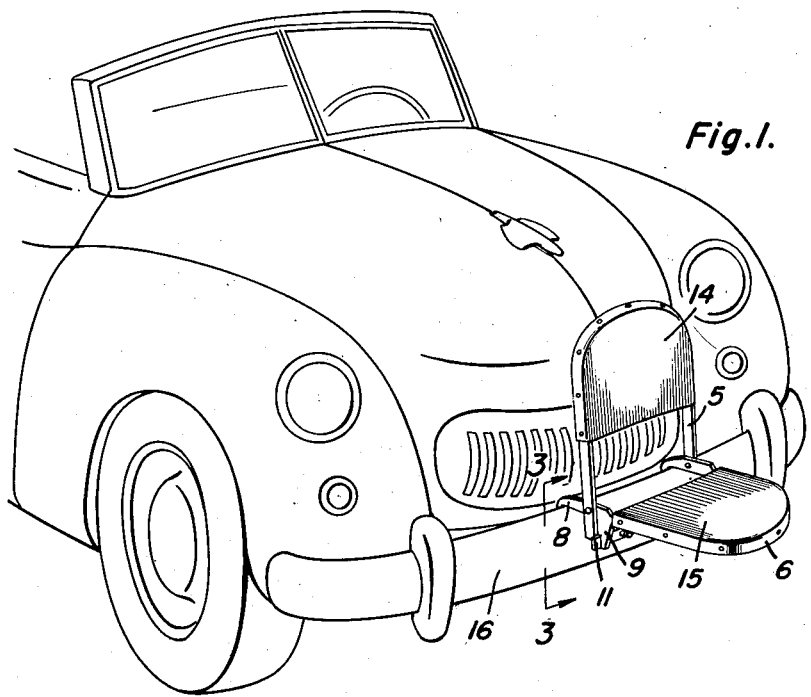
Figure 1 is a perspective view showing the seat in attached position.

Referring now to the drawing in detail wherein for the purpose of illustration I have disclosed a preferred embodiment of the invention, the numeral 5 designates a U-shaped back frame and the numeral 6 designates a U-shaped seat frame pivoted to each other at their end portions by means of rivets or the like 7 for folding the frames one against the other. Hooks 8 project rearwardly from the ends of the seat frame 6 and a web or bracket 9 projects downwardly from each end portion of the seat frame 6 inwardly of hooks 8 with a cross bar 10 suitably secured to the lower edges of webs 9 and projecting outwardly from the webs to form stops 11.

A pair of adjusting screws 12 are threaded in the bar 10 and are provided with heads 13 extending in a rearward direction and opposed to hooks 8.

The back frame 5 is provided with a covering 14 of suitable material and the seat frame 6 is provided with a similar covering 15, both of which may be padded, if desired.

In the operation of the device back and seat frames 5 and 6 are swung into an open position on pivots 7 until the lower ends of back frame 5 engage stops 11 to thus position the back frame 5 upright while the seat frame 6 is positioned horizontally.

Figure 3:
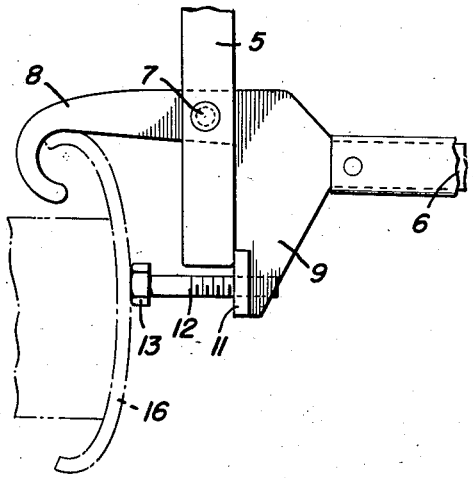

Hooks 8 are then engaged over the top of an automobile bumper 16 and the adjusting screws 12 adjusted to bear against the face of the bumper in the manner as shown in Figure 3 of the drawing whereby to support the seat on the bumper.

Figure 2:
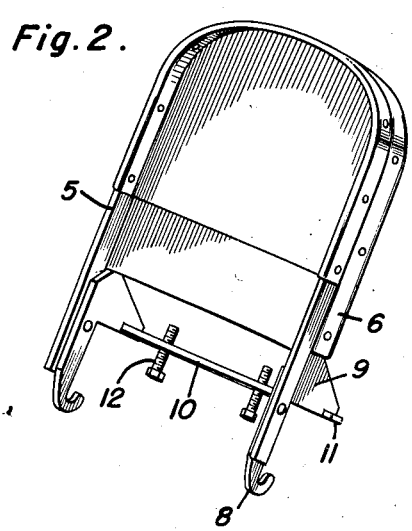
Figure 2 is a perspective view showing the seat detached and in folded position; and, Figure 3 is an enlarged sectional view taken on a line 3—3 of Figure 1.

When not in use the seat is folded into the form as shown in Figure 2 for conveniently carrying or storing the same.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A foldable seat comprising U-shaped back and seat frames, said seat frame including a transverse member means pivotally connecting the ends of the frames to each other for folding one against the other, hooks at the pivoted ends of the seat frame adapted for engaging the upstanding edge of a supporting structure, and abutments carried by said transverse member of the seat frame adapted for bearing against the front of the supporting structure to support the seat in open position thereon.

2. A foldable seat comprising U-shaped back and seat frames, said seat frame including a transverse member means pivotally connecting the ends of the frames to each other for folding one against the other, hooks on the pivoted ends of the seat frame adapted for engaging the upstanding edge of a supporting structure, and adjustable abutments carried by said transverse member of the seat frame adapted for bearing against the front of the supporting structure to support the seat in open position thereon.

3. A foldable seat comprising U-shaped back and seat frames, said seat frame including a transverse member means pivotally connecting the ends of the frames to each other for folding one against the other, hooks on the pivoted ends of the seat frame adapted for engaging the upstanding edge of a supporting structure, adjusting screws carried by said transverse member of the seat frame adapted for abutting the front of the supporting structure to support the seat in open position thereon, and a stop on the seat frame engaged by the pivoted edge of the back frame to limit rearward swinging movement of the latter.

4. A foldable seat comprising a U-shaped back frame and a U-shaped seat frame, means pivotally connecting the ends of the frames to each other for folding the frames one upon the other, hooks at the pivoted ends of the seat frame adapted for engaging an upstanding edge of a supporting structure to support the seat frame in a horizontal position, a cross bar rigidly connecting the inner ends of the seat frame to each other, said cross bar forming a stop adapted for engagement by the pivoted ends of the back frame to limit rearward swinging movement of the latter, and adjustable means carried by the cross bar adapted to engage the supporting structure and to hold the hooks in clamping engagement therewith.

JAMES D. BRANSON.

REFERENCES CITED

The following references are of record in the file of this patent:

UNITED STATES PATENTS

| Number | Name | Date |
|---|---|---|
| 565,764 | Lynch | Aug. 11, 1896 |
| 2,152,014 | Ashe et al. | Mar. 28, 1939 |
| 2,228,203 | De Hoffmann | Jan. 7, 1941 |